US009741156B2

(12) United States Patent
Marison et al.

(10) Patent No.: US 9,741,156 B2
(45) Date of Patent: Aug. 22, 2017

(54) MATERIAL TROUBLE SHOOTER (75) Inventors: Scott Marison, Honolulu, HI (US);
Jean-Pierre Duplessis, Kirkland, WA (US); Jacob Meyer, Honolulu, HI (US); Tito Pagán, Redmond, WA (US); Boris S. Jabes, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 62 days.

(21) Appl. No.: 13/227,494

(22) Filed: Sep. 8, 2011

(65) Prior Publication Data
US 2013/0063439 A1 Mar. 14, 2013

(51) Int. Cl.
*G06T 15/04* (2011.01)
*G06T 1/60* (2006.01)
*G09G 5/393* (2006.01)
*G09G 5/14* (2006.01)
*G06T 15/80* (2011.01)
*G06T 15/50* (2011.01)
*G06T 15/06* (2011.01)
*G06T 15/60* (2006.01)

(52) U.S. Cl.
CPC .............. *G06T 15/04* (2013.01); *G06T 15/50* (2013.01); *G06T 15/80* (2013.01); *G06T 15/06* (2013.01); *G06T 15/60* (2013.01)

(58) Field of Classification Search
CPC ......... G06T 1/60; G06T 15/04; G06T 15/005; G09G 5/393; G09G 5/14
See application file for complete search history.

(56) References Cited

U.S. PATENT DOCUMENTS

| 7,098,925 | B1 | 8/2006 | Lake et al. | |
|---|---|---|---|---|
| 7,986,325 | B1* | 7/2011 | Gold et al. | 345/506 |
| 2008/0246760 | A1 | 10/2008 | Jeong et al. | |
| 2009/0123045 | A1 | 5/2009 | Quadling et al. | |
| 2011/0096083 | A1 | 4/2011 | Schultz | |
| 2012/0299943 | A1* | 11/2012 | Merry | 345/589 |

OTHER PUBLICATIONS

Simpson, "Extreme Tech-Article: Game Engine Anatomy 101", Apr. 12, 2002.*
Carter, "Book: The Game Asset Pipeline, Published by: Cengage Learning", pp. 12-13, Sep. 15, 2004.*
RamenFix, "More Awesome Than you", updated Aug. 25, 2008.*
Aqsis, "The Aqsis Texturing Library", dated: Jan. 18, 2010.*
BASys, "Missing textures", Revision as of 23:29, Feb. 27, 2010, From FSDeveloper Wiki.*
"Create and edit textures for 3D models (Photoshop Extended)", Retrieved at <<http://help.adobe.com/en_US/Photoshop/11.0/WS0BA787A7-E4AC-4183-8AB7-55440C51F95B.html>>, Retrieved Date: Jul. 12, 2011, pp. 5.

(Continued)

*Primary Examiner* — Saptarshi Mazumder (57) ABSTRACT

A materials trouble shooter is provided for use with 3D models in computer graphics. An error texture is displayed that is distinguishable from textures without errors. If a texture is missing or is applied incorrectly to the 3D model, an error texture is displayed using an error shader instead of a regular shader for the texture for which an error in loading or application has been detected.

20 Claims, 9 Drawing Sheets (56) References Cited

OTHER PUBLICATIONS

Charlie, "Loading Complex Models", Retrieved at <<http://msdn.microsoft.com/en-us/library/ff649664.aspx>>, Jan. 22, 2008, pp. 17.
Lowe, Nick, "An Introduction to Real-time Rendering Using OpenGL", Retrieved at <<http://60hz.csse.uwa.edu.au/workshop/workshop0/workshop3.html>>, Retrieved Date: Jul. 12, 2011, pp. 3.
"3D BRUSH", Retrieved at <<http://www.3d-brush.com/features.html>>, Retrieved Date: Jul. 12, 2011, pp. 4.

* cited by examiner

MATERIAL TROUBLE SHOOTER

BACKGROUND

In three-dimensional (3D) computer graphics, a 3D model is a mathematical representation of a three-dimensional surface or object. A 3D model can be displayed as a two-dimensional (2D) image through 3D rendering. A 3D model can represent a 3D surface or object using a collection of points in 3D space, connected by various geometric shapes such as triangles, lines, curves and so on. 3D models are widely used in 3D graphics on personal computers and other devices in a wide variety of applications including but by no means limited to computer gaming. For example, computerized 3D models are used in the medical industry, in simulators, in movies, to represent chemical compounds, for architectural and landscaping uses, in engineering and for geological models, to name just a few.

Texture mapping is a method for adding detail, surface texture or color to a computer-generated graphic or 3D model. A texture map can be applied to the surface of a shape or polygon. Each vertex in a polygon can be assigned a texture coordinate either by explicit assignment or by procedural definition. Image sampling locations can be interpolated across the face of a polygon to achieve a more realistic appearance. Multiple textures can be applied to a surface. For example, applying a light map texture may be used to light a surface instead of recalculating the lighting each time the surface is rendered.

SUMMARY

When viewing or editing a 3D model during development or testing, it is sometimes hard to know if the 3D model is rendering as it was meant to be rendered by the artist. Most modeling tools display a default gray color if an error finding or applying the intended texture occurs. Thus, when viewing a 3D model all or portions of which are gray, a 3D model intentionally designed gray is indistinguishable from a 3D model for which an error occurred in the texture rendering. Errors in material or texture loading and texture application can be detected and flagged as an error. During rendering, in response to the error flag, an error texture that is distinguishable from a non-error texture can be provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A computer graphics pipeline typically transforms 3D data such as 3D models and/or 2D data into 2D data suitable for display using a pixel matrix or frame buffer and graphics software and/or hardware. In the computer graphics pipeline, compiled shading language programs and geometry data are sent to a graphics processing unit on a graphics card or to the motherboard of a computer or computing device. The geometry data is transformed and calculations including but not limited to lighting calculations are performed in a vertex shader. An optional geometry shader can operate to change some of the geometries in the scene. The calculated geometry can be subdivided into triangles in an operation called triangulation. The triangles can be broken down into pixels and displayed on the display device.

3D models are used in computer graphics to represent objects and surfaces. When using a 3D model in computer applications, various errors can occur. For example, an error loading a material may occur. The term material refers to a collection of attributes assigned to a group of polygons in a 3D model. Material attributes commonly include textures, shaders, lighting attributes that control how the material interacts with lights in the 3D scene, and so on. Similarly, one or more textures for the 3D model can be missing or can be corrupted or can be applied incorrectly. There may be no way to know that a texture is missing, corrupted or misapplied when developing an application that includes a 3D model. The missing or misapplied texture may be noticeable when the application executes or it may be indistinguishable from an intentionally applied texture. In accordance with aspects of the subject matter disclosed herein, a visual indication is provided to identify portions of a 3D model for which a texture error has occurred.

Material Trouble Shooter

Figure 1:
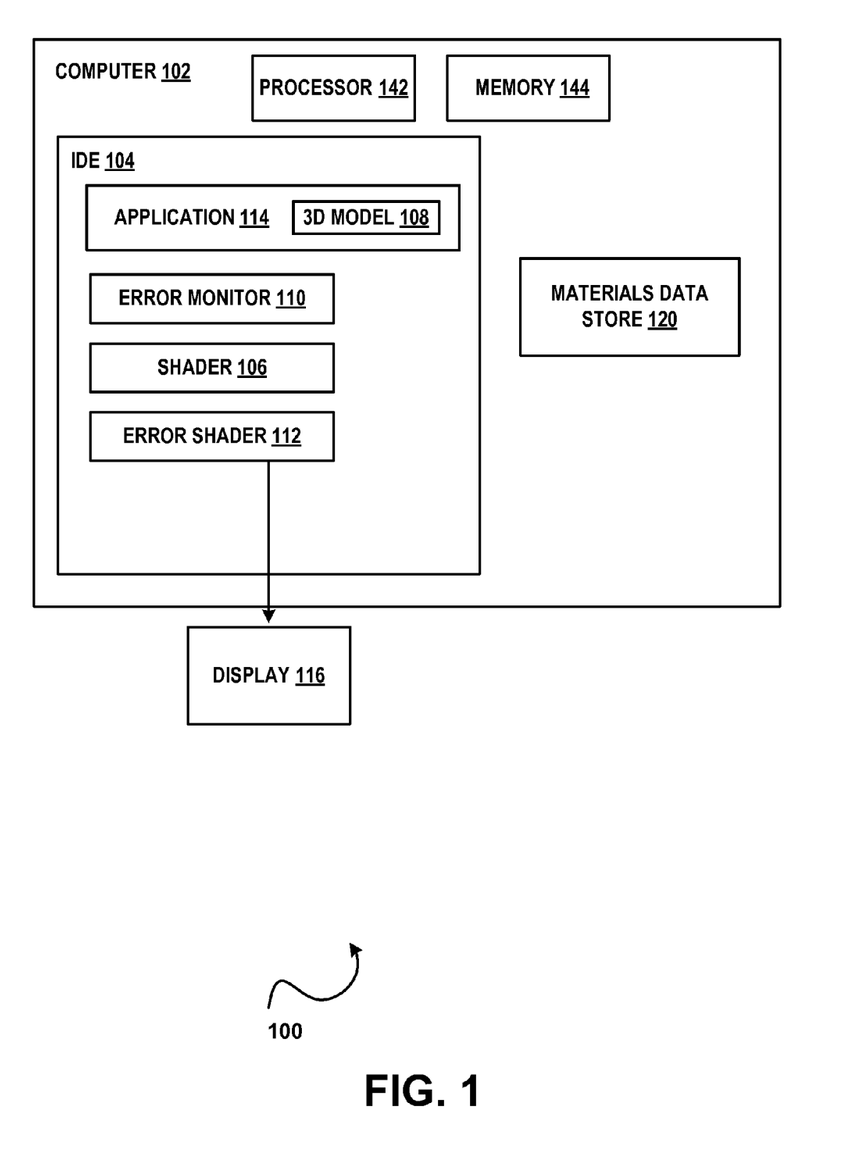
FIG. 1 illustrates an example of a system 100 that can visually distinguish texture errors from non-errors in accordance with aspects of the subject matter disclosed herein.

FIG. 1 illustrates an example of a system 100 that identifies missing or misapplied materials or textures in 3D models in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an IDE or may execute outside of an IDE. The IDE can be an IDE such as the one described with respect to FIG. 4 or can be any other IDE that supports the development or testing of 3D models. All or portions of system 100 may be implemented as a plug-in or add-on.

System 100 may include one or more computers or computing devices such as a computer 102 comprising: one or more processors such as processor 142, etc., a memory such as memory 144, one or more modules such as error monitor 110 that monitors loading of and/or application of texture to 3D models. System 100 may also include one or more modules such as an error shader 112 that displays one or more error indications when a texture error has occurred for the 3D model (e.g., 3D model 108 of application 114). System 100 may include other well-known components or modules that are not shown.

In computer graphics, a traditional shader such as shader 106 defines a set of operations performed on a geometric object to produce a particular graphical effect. A shader such as shader 106 can be a pixel shader or a vertex shader. A pixel shader acts upon a pixel, and can affect characteristics of the pixel such as color, alpha value and so on. A pixel shader typically calculates the color of each individual pixel. A pixel shader (also sometimes called a fragment shader) can be used for scene lighting, bump mapping and color toning. A pixel shader can be called multiple times for each pixel.

A vertex shader acts upon a vertex of a primitive and can affect characteristics of the vertex such as position, texture coordinates, z-depth, colors, and so on. The vertex shader can transform the 3D position of the vertex in virtual space to the 2D coordinate at which the vertex appears in the display and can include a depth value. The output of the vertex shader typically goes to the next stage in the computer graphics pipeline, (e.g., to a geometry shader or to a rasterizer). The output vertex can be rendered as a collection of pixels displayed on a display device.

In system 100, as a 3D model loads, either at runtime or during development of an application including one or more 3D models in an IDE such as IDE 104 (e.g., at design time), an error monitor such as error monitor 110 may monitor the loading and/or texture application process and may flag a 3D model for which a loading and/or texture application error occurs. For each material that is loaded from a materials data store such as materials data store 120, the error monitor 110 can monitor the loading and application of the material and flag each material for which a loading or application error occurred. In response to determining that a material has been flagged, instead of using the regular shader, a substitute error shader such as error shader 112 can be invoked. Error shader 112 can be a vertex shader or a pixel shader. The error shader can substitute an error material in the materials data store 120 for the flagged material. Alternatively, the error materials data store (not shown) can be a separate data store from the regular materials data store and the error shader can substitute an error material in the error materials data store 120 for the flagged material.

The error material can be any configured error material including but not limited to: an error material that displays "ERROR" on the surface, an error material that shimmers or glows (using a vertex and/or pixel shader to produce the shimmering or glowing effect), an error material that displays the portion of the 3D model having the texture error with a flashing background, and so on. In accordance with some embodiments, the error effect applied can be selected by the user from a set of provided error effects. In accordance with aspects of the subject matter disclosed herein, an error user interface may be displayed that displays a texture error warning message (e.g., "missing texture", "texture corrupted", "texture misapplied", etc.).

In accordance with some aspects of the subject matter disclosed herein, the error effect can be projected from the point of view attic camera onto the object or surface with the texture error. This can be implemented by receiving a position of the 3D model with the texture error in 3D space, and performing a matrix multiplication on the coordinates converting the coordinates to a normalized screen space called the unit cube. Traditionally, the matrix math is performed in the vertex shader to transform the points of the 3D model. In accordance with aspects of the subject matter described herein, the matrix math is performed in the pixel shader to generate texture coordinates in order to map the error texture onto the 3D model in a specialized way. The camera's position in the unit cube can be taken into account so that the surface with the error is displayed in facing front view regardless of movement of the object. That is, the error texture can produce the effect of a transparent film that reveals a backdrop that remains stationary relative to the camera position as the 3D model moves or as the camera moves around the 3D model or towards or away from the 3D model. The 3D model with the error material substituted for the flagged material can be displayed on a display device such as display device 116. A display device such as display device 116 can be can be a display screen of a computing device, a television, a portable media player, a telephone, a smart phone or any other suitable device that displays computer graphics.

Figure 2A:
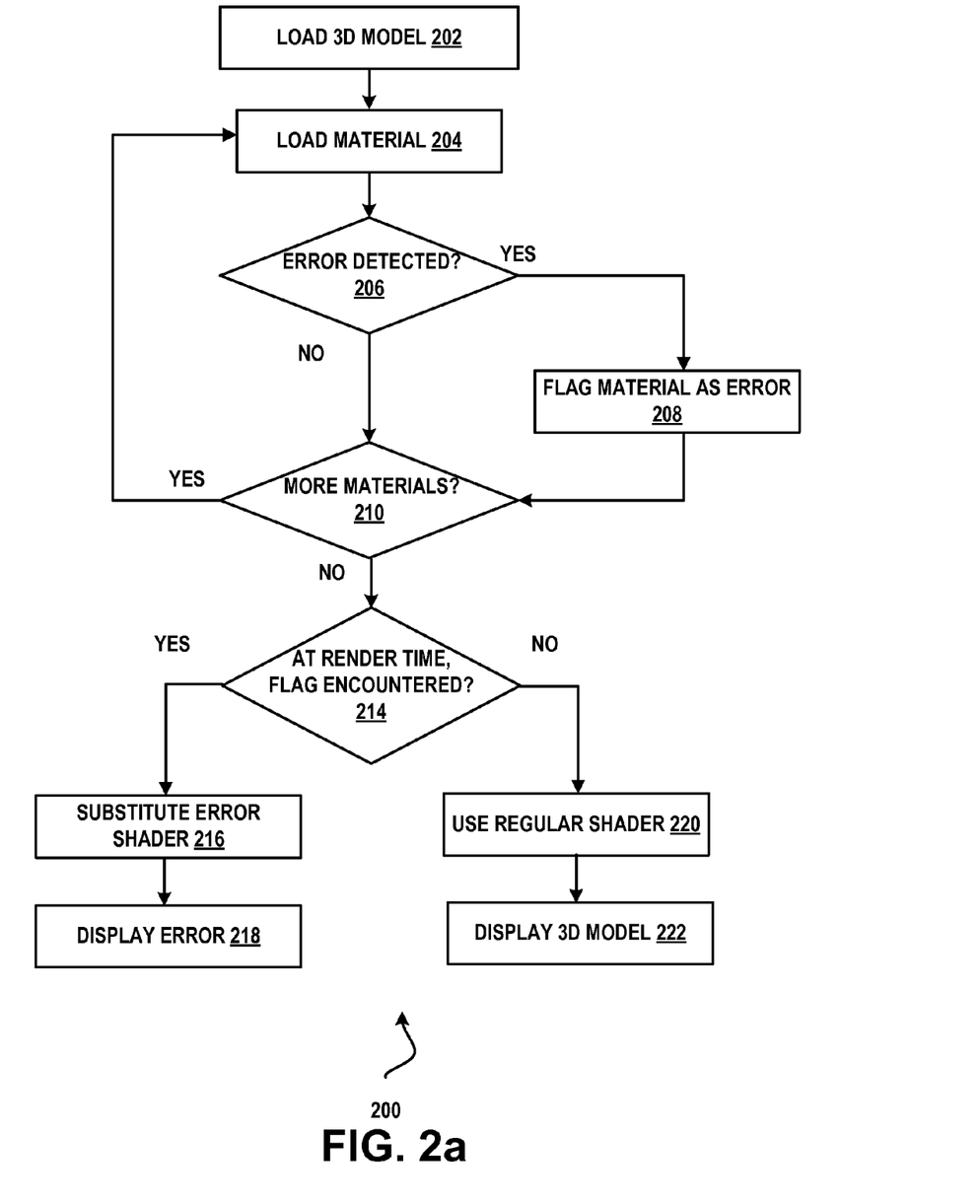
FIG. 2*a* illustrates an example of a method that visually distinguishing texture errors from non-errors in accordance with aspects of the subject matter disclosed herein.

FIG. 2a illustrates a method 200 that trouble shoots materials in accordance with aspects of the subject matter disclosed herein. The method described in FIG. 2a can be practiced by a system such as but not limited to the one described with respect to FIG. 1. While method 200 describes a series of acts that are performed in a sequence, it is to be understood that method 200 is not limited by the order of the sequence. For instance, some acts may occur in a different order that that described. In addition, an act may occur concurrently with another act. In some instances, not all acts may be performed.

At 202 loading of a 3D model can be initiated. Loading can occur during runtime or during development or design time. The 3D model loaded at 202 can include one or more materials. A material can be a collection of attributes assigned to a group of polygons in the 3D model. Material attributes can include one or more textures, one or more shaders and one or more lighting attributes. A lighting attribute can control how a material interacts with lights in a 3D scene. As each material of the flagged 3D model is loaded at 204, the material can be monitored for load or application errors at 206. If no material load or application error is detected, the next material can be loaded in response to determining that there are more materials to load at 210 and so on until all the materials for the 3D model have been loaded. At 206 in response to detecting an error with loading or applying a material or texture, the material can be flagged as an error at 208. In response to determining at 210 that there are more materials to load, the next material can be loaded at 204. In response to determining that there are no more materials to load at 210, processing can continue at 214.

At 214 at rendering time, if an error flag is not detected for a material, the regular shader can be invoked at 220 and the 3D model can be displayed at 222. If at 214 at rendering time, an error flag is detected for a material, a substitute error shader 216 can be invoked. The substitute error shader can display a substitute error material instead of the material for which a load or application error was detected at 218. While the above has been described in the context shaders, it will be appreciated that the subject matter disclosed herein applies as well in the context of a Fixed Function Pipeline.

Figure 2B:
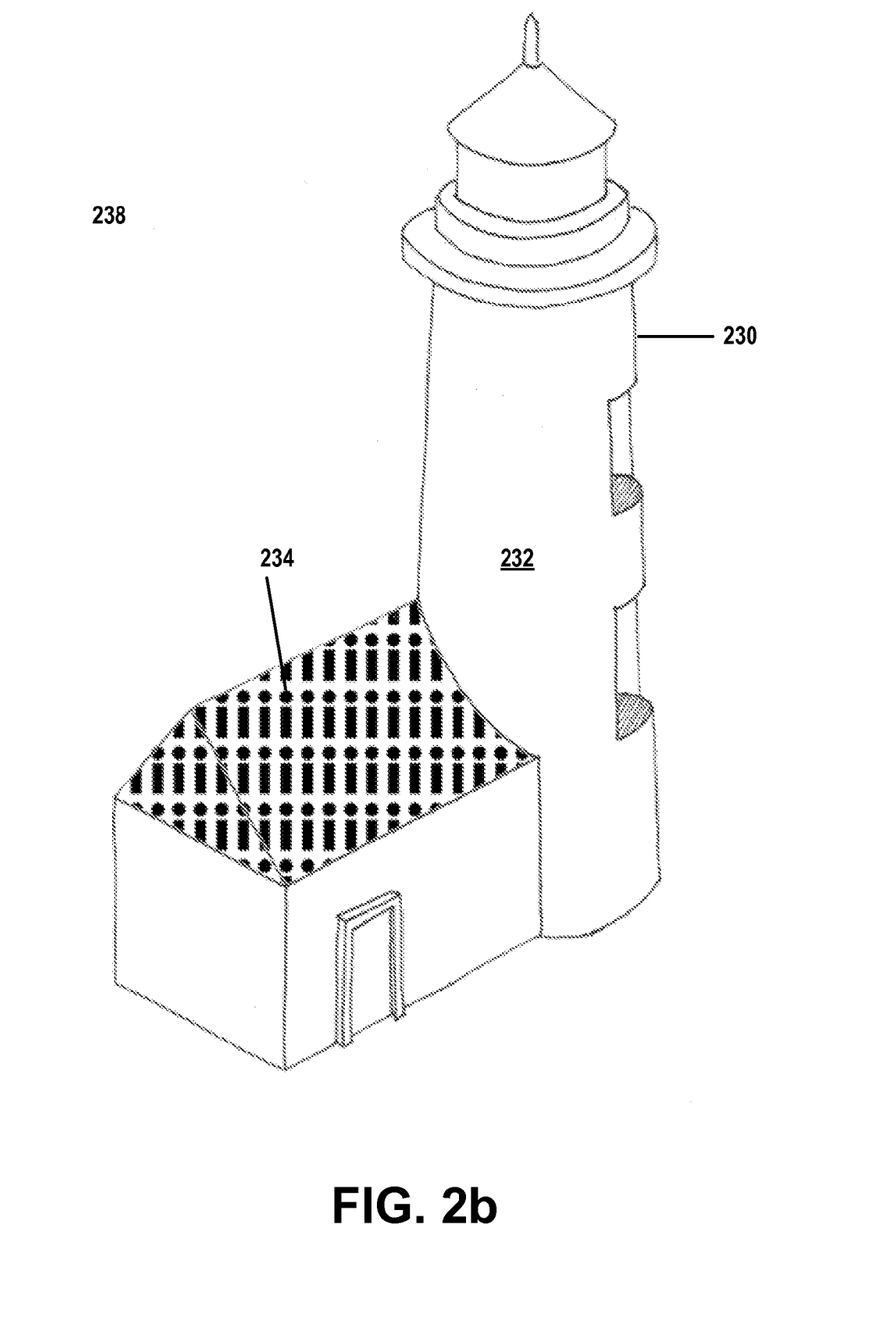
FIGS. 2*b-f* illustrate examples of a visual indication of a texture error in accordance with aspects of the subject matter disclosed herein.

FIGS. 2b-2f illustrate examples of a visual indication of a texture error. FIG. 2b illustrates the 2D rendering of a 3D model of a lighthouse 230, as it might appear on a display. Areas of the lighthouse 230 such as area 232 and background 238 are rendered correctly. Areas of the lighthouse 230 are rendered incorrectly. More specifically, area 234 displays an error texture comprising a stationary field of rows of filled in circles alternating with rows of filled in rectangles.

Figure 2C:
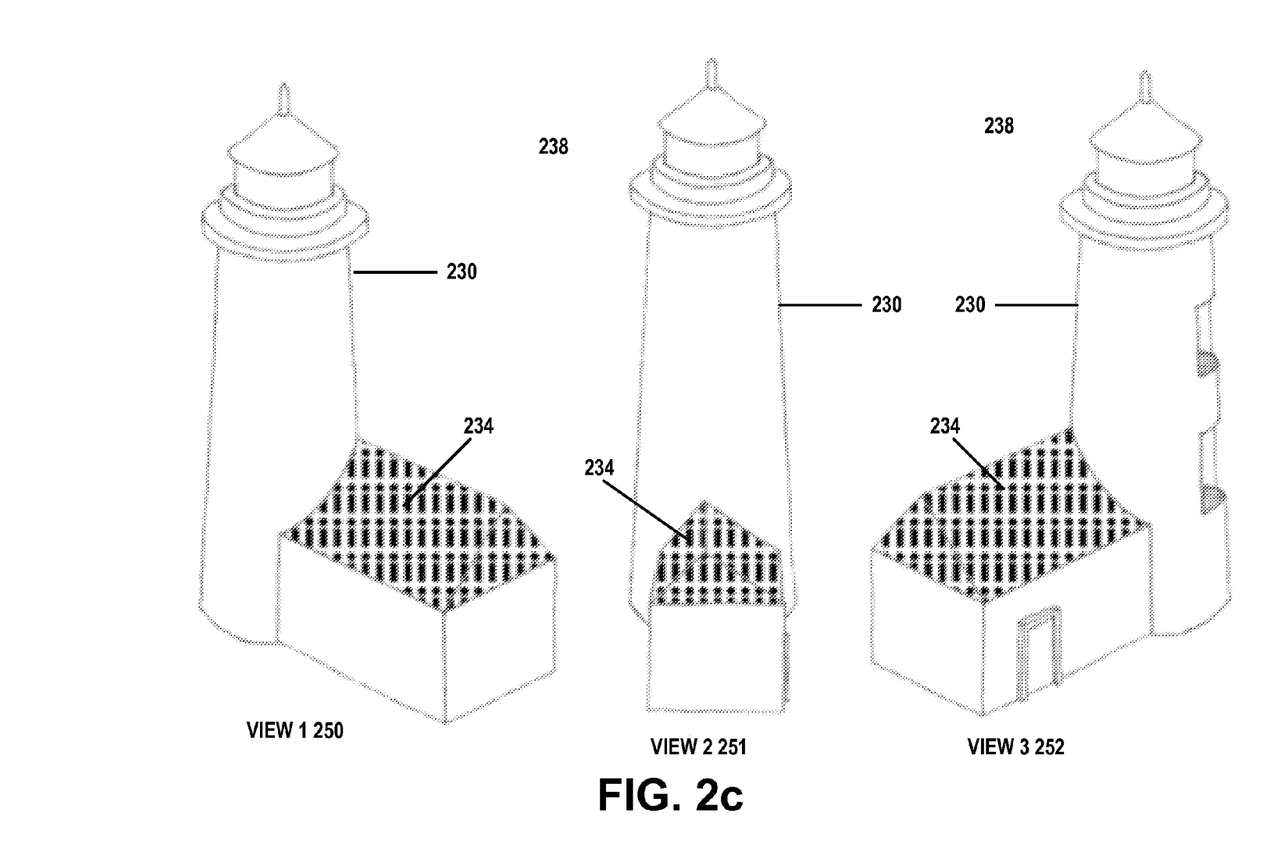
Figure 2D:
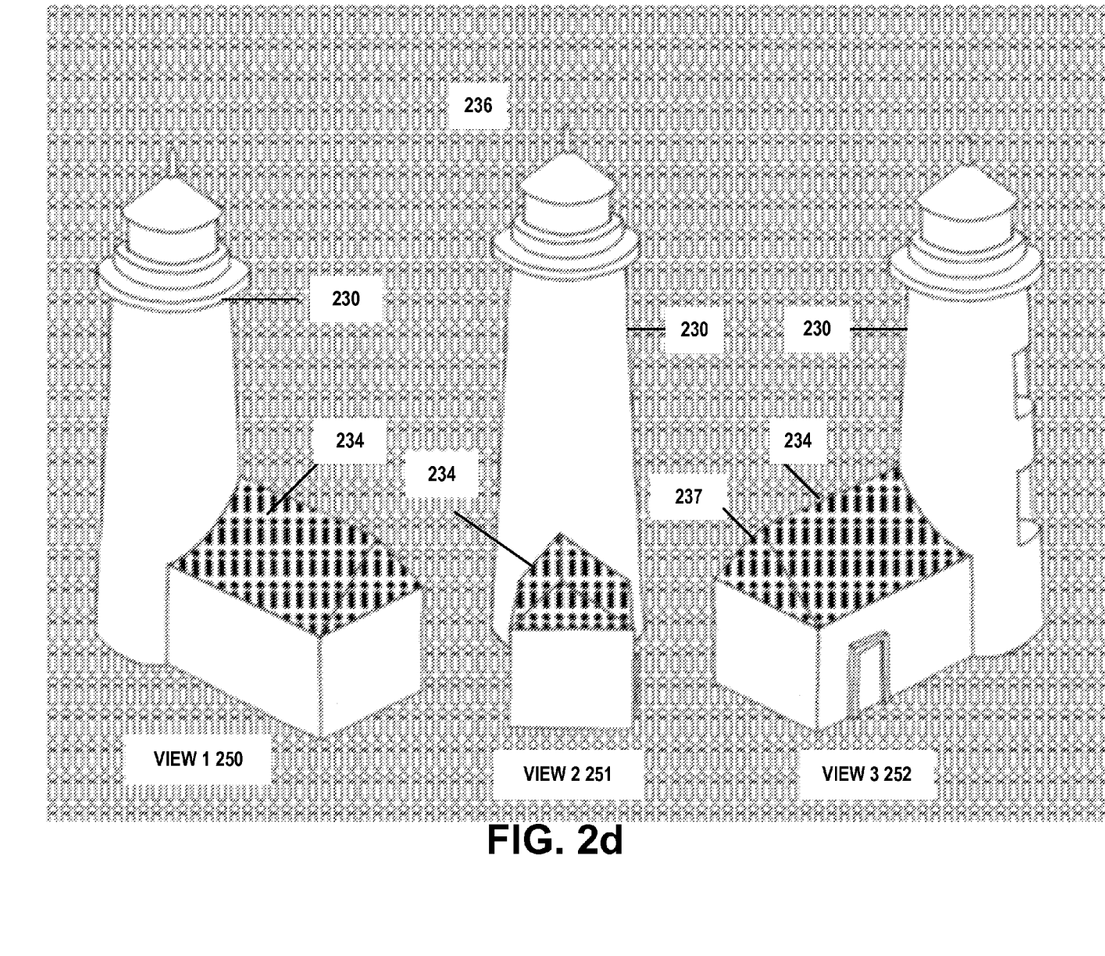

FIG. 2c illustrates various views (e.g., view 1 250 at time 0, view 2 251 at time 0+x and view 3 252 at time 0+y, y>x) of lighthouse 230 as it might appear on a display as lighthouse 230 rotates around an axis, or as the lighthouse 230 would appear to a camera that moves around the lighthouse 230 in a counter-clockwise direction. FIG. 2d is a representation of the various views of the lighthouse 230 of FIG. 2c depicting the stationary error background. FIG. 2c illustrates the error texture area 234 as it appears in a display of the rotating lighthouse 230. It will be appreciated that area 234 is visually distinguishable from an intended texture because the error texture operates as if a transparent window allows a stationary error background to appear in areas for which an error was detected. As a camera moves around the model, the error background becomes visible where an error rendering the texture occurs, as in area 234.

In FIG. 2d the stationary error texture background is represented by the alternating rows of circles and rectangles. The alternating rows and circles are filled in for areas for which an error occurred and are not filled in areas such as background area 236 for which an error did not occur. In FIG. 2d area 234 is an area for which an error in loading or application has occurred. The alternating rows of circles and rectangles are filled in. For example, in view 3 252 of lighthouse 230, the upper portion of rectangle 237 is empty while the bottom portion of rectangle 237 is filled in. The upper portion of rectangle 237 is empty (not filled in) because the error texture is not displayed because no error was detected with background area 236. The bottom portion of rectangle 237 is filled in because some error was detected with the texture of area 234.

Figure 2E:
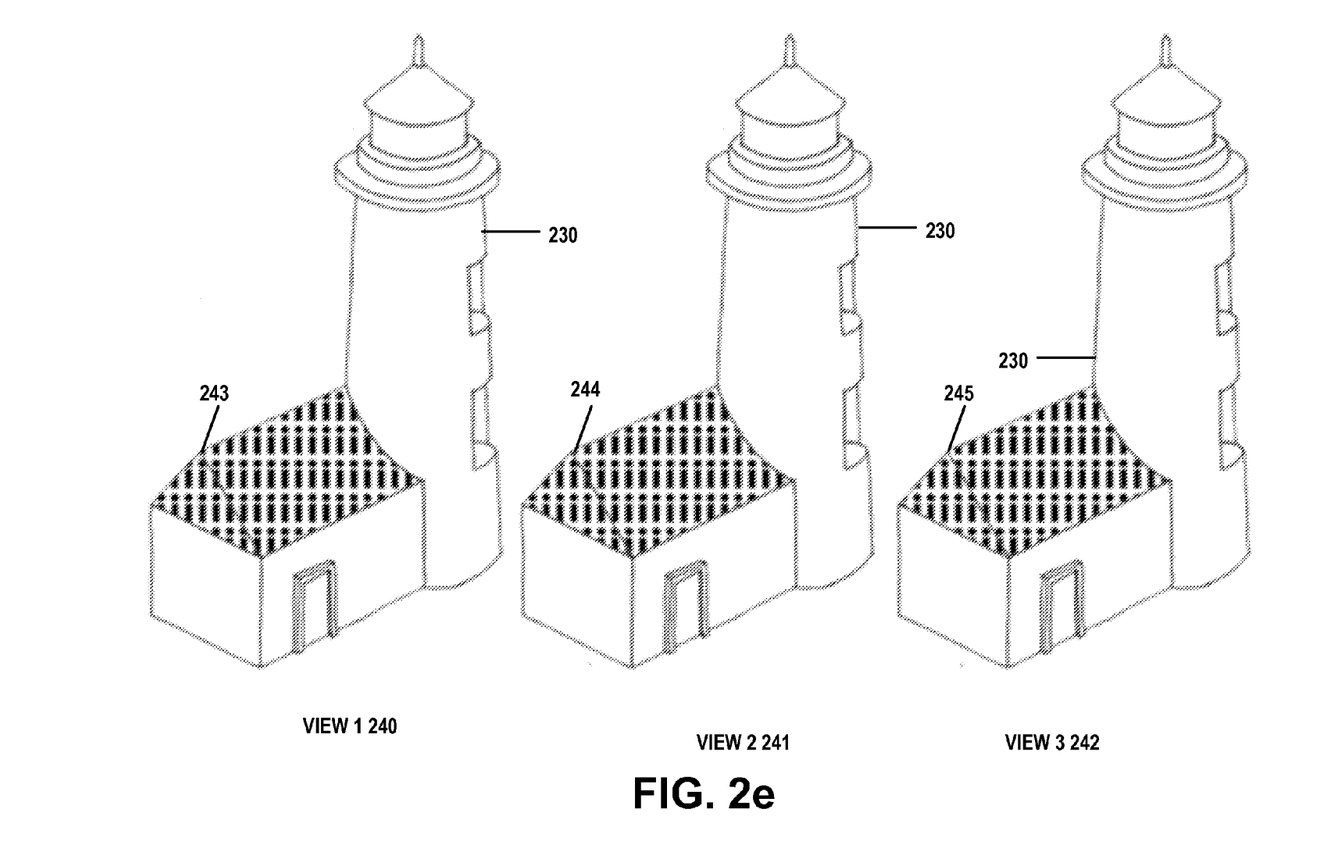
Figure 2F:
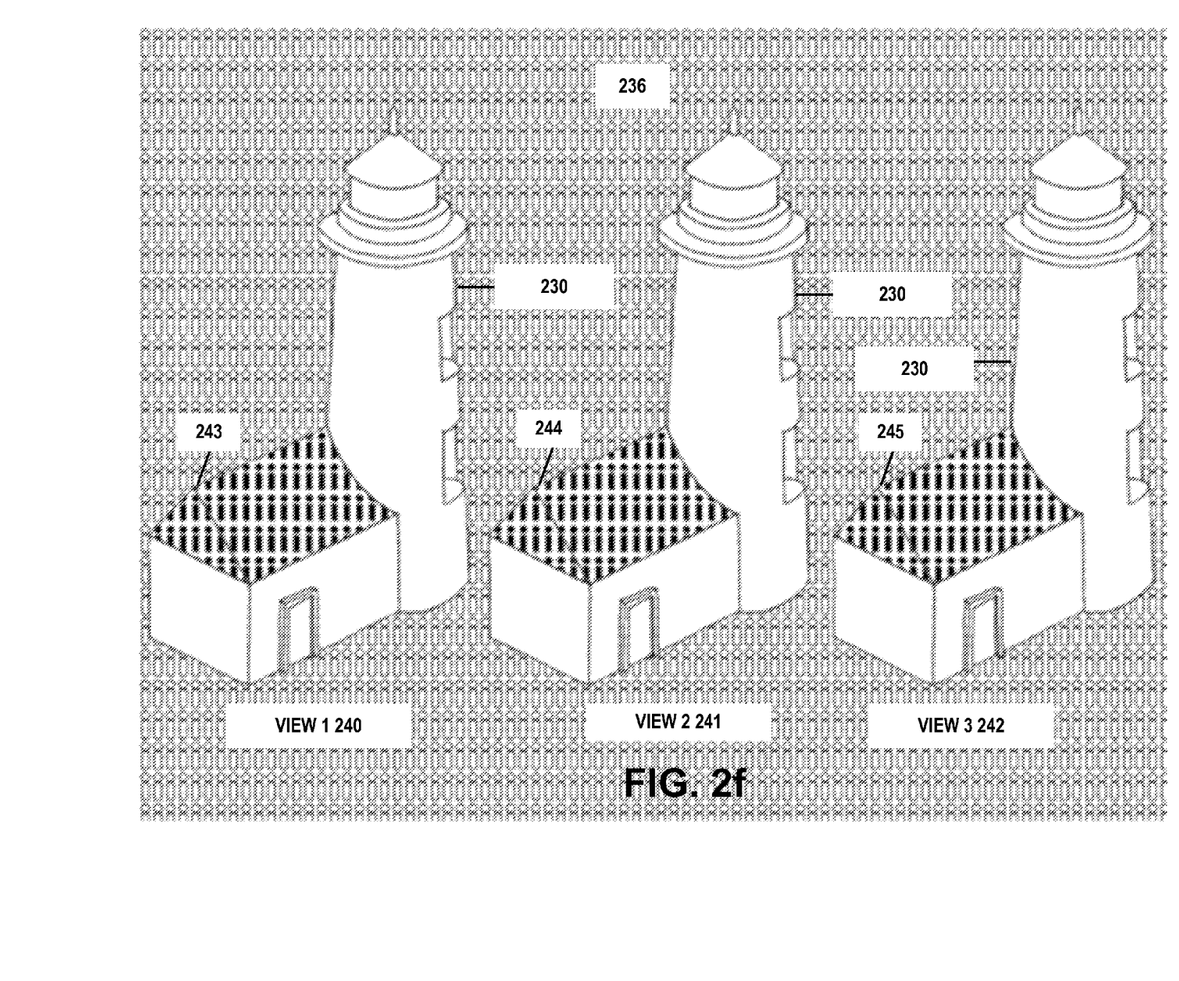

FIGS. 2e and 2f illustrate a similar example of a 3D model of a lighthouse 230 that is shown as it advances from one side to another (e.g., from left to right or from right to left). As the lighthouse appears to move across the screen, the background, whether visible or invisible in the display, remains stationary. This is illustrated in FIG. 2e and FIG. 2f by analogous points of the different views (e.g., view 1 240, view 2 241 and view 3 242) of lighthouse 230 revealing a different section of the background in the different views of the lighthouse 230. For example point 1 243 of view 1 240 is analogous to point 2 244 of view 2 241 which is analogous to point 3 245 of view 3 242. However, the error texture displayed at point 1 243 differs from the error texture displayed at point 3 245. That is, point 1 243 and point 2 244 fall in a rectangle and point 3 245 falls in white space. Moreover, the error background lacks perspective even though a viewer would expect an intended texture to have perspective. In accordance with some aspects of the subject matter disclosed herein, the error background instead of having no perspective may have an incorrect perspective.

Example of a Suitable Computing Environment

Figure 3:
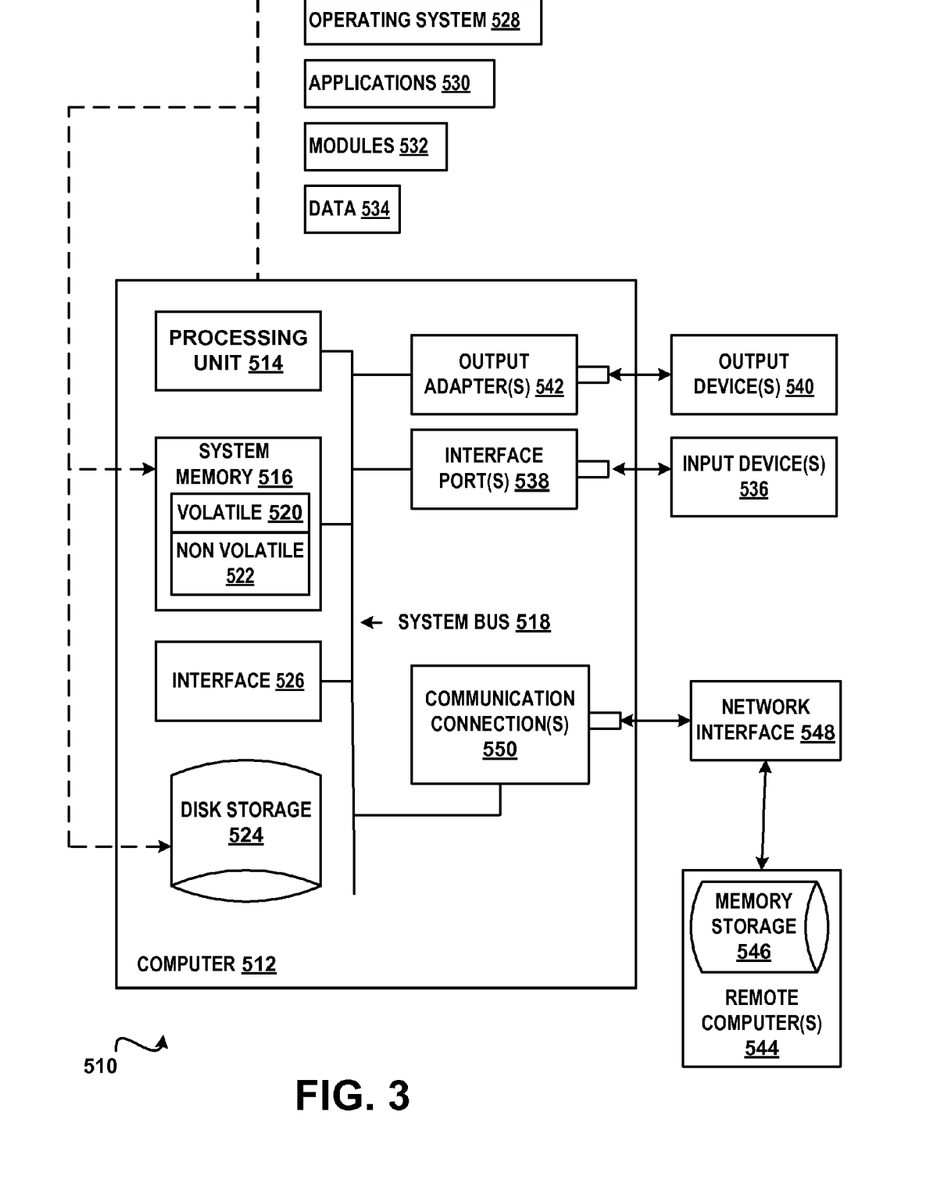
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device 514 can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
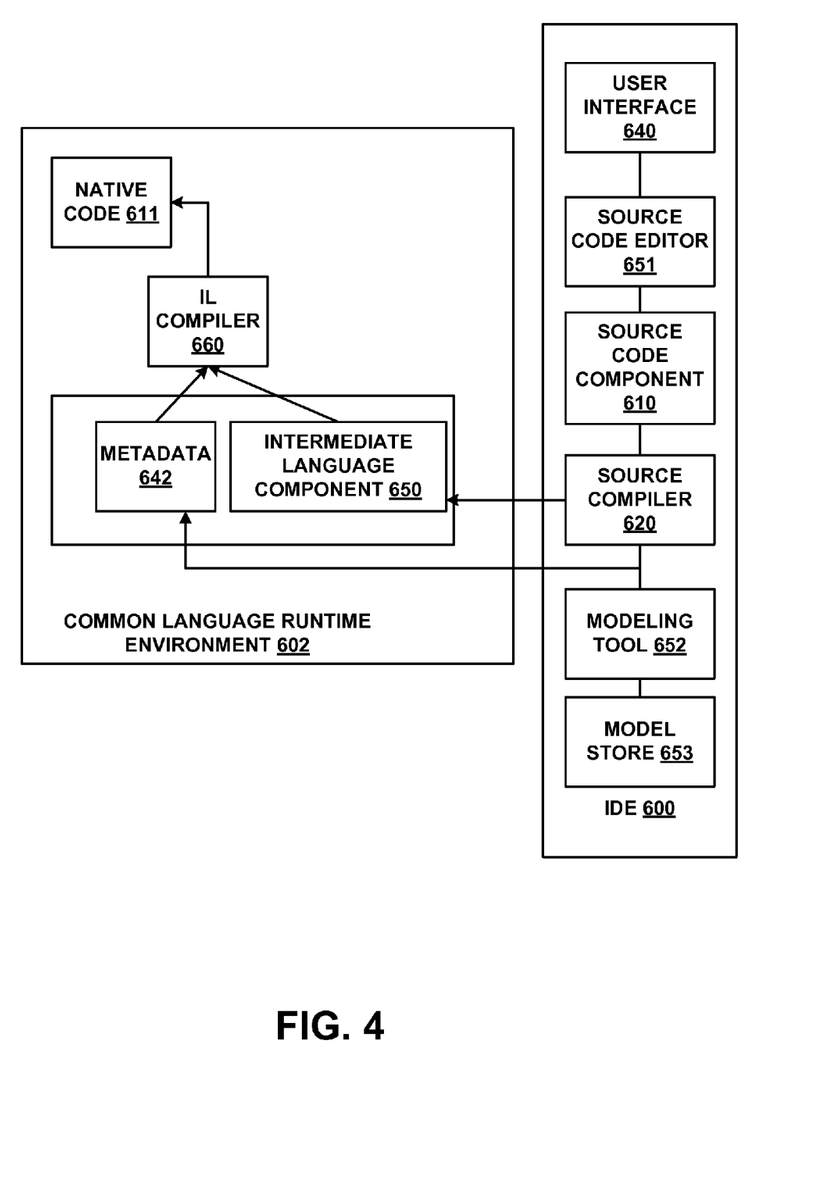
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, M L, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    at least one processor of a computing device;
    a memory of the computing device; and
    at least one module loaded into the memory causing the
        at least one processor to:
        monitor for occurrence of a load error for a material of
            a 3D model, a load error for a texture of the 3D
            model, and a texture application error for a texture of
            the 3D model;
        in response to detecting a load error for a material of the
            3D model, a load error for the texture of the 3D model or a texture application error for the texture of the 3D model, flagging the texture in a materials data store; and in response to detecting the flagged texture at rendering time, invoke a dedicated error shader module to display an error texture as a substitute for the flagged texture, wherein the error texture produces an error effect that is displayed onto a surface or object of the 3D model in response to a camera moving around, towards or away from the 3D model;

wherein the error texture comprises a rendered texture that when rendered displays a transparent surface revealing a background which remains stationary relative to the moving camera position.

2. The system of claim 1, wherein the error texture is provided as a user input.

3. The system of claim 1, wherein the error texture comprises a texture that when rendered displays a glowing effect, a shimmering effect, or a flashing background.

4. The system of claim 1, wherein the at least one module operates within an integrated development environment.

5. The system of claim 1, further comprising a display device that displays the 3D model with the error texture substituted for the texture for which an error was detected.

6. The system of claim 1, wherein the dedicated error shader module is a vertex shader.

7. The system of claim 1, wherein the dedicated error shader module is a pixel shader.

8. A method comprising:
for at least one texture in a 3D model of a computer graphics application:
monitoring for a texture error associated with a texture of the 3D model loaded by a processor of a software development computer;
in response to detecting the texture error, associating an error flag with the texture in a materials data store;
when the 3D model is rendered, calling a dedicated error shader in response to detecting the error flag associated with the texture;
replacing the flagged texture with an error texture associated with the dedicated error shader as a substitute for the flagged texture;
displaying the 3D model on a display device with the error texture,
wherein the error texture produces an error effect that is displayed on a surface or object of the 3D model in response to movement of a camera around, towards or away from the 3D model,
wherein the error texture comprises a rendered texture that when rendered displays a transparent surface revealing a background which remains stationary relative to the moving camera position.

9. The method of claim 8, wherein the dedicated error shader is a pixel shader.

10. The method of claim 8, wherein the dedicated error shader is a vertex shader.

11. The method of claim 8, wherein the texture error is a load error.

12. The method of claim 8, wherein the texture error is a texture application error.

13. The method of claim 8, wherein the texture error is a corruption error.

14. The method of claim 8, wherein an error texture comprises a texture that creates a glowing effect, a flashing effect, a shimmering effect or a transparent surface revealing a background that is stationary relative to a camera position.

15. A device, comprising:
at least one processor and a memory; wherein the at least one processor is configured to:
monitor loading of a 3D model and the materials associated with the 3D model in a computer graphics application;
in response to detecting an error associated with a texture associated with the 3D model, associate an error flag with the texture in a materials data store;
when the 3D model is rendered, call a dedicated error shader in response to detecting the error flag associated with the texture;
replace the flagged texture with the error texture associated with the dedicated error shader; and
display the 3D model on a display device with the error texture using the dedicated error shader, wherein the error texture produces an error effect that is displayed on a surface or object of the 3D model in response to a camera moving around, towards or away from the 3D model,
wherein the error texture comprises a rendered texture that when rendered displays a transparent surface revealing a background with remains stationary relative to the moving camera position.

16. The device of claim 15, wherein the at least one processor is further configured to:
display the 3D model from a perspective of a camera as the 3D model moves.

17. The device of claim 15, wherein the at least one processor is further configured to:
call an error shader comprising a vertex shader.

18. The device of claim 15,
wherein the dedicated error shader comprises a pixel shader.

19. The device of claim 18, wherein the at least one processor is further configured to:
display the error texture comprising a glowing, flashing or shimmering texture.

20. The device of claim 15,
wherein the error is in response to at least one of a load error, a texture application error, or a corruption error.

* * * * *